United States Patent [19]
Gradzki

[11] Patent Number: 5,982,110
[45] Date of Patent: Nov. 9, 1999

[54] COMPACT FLUORESCENT LAMP WITH OVERCURRENT PROTECTION

[75] Inventor: Pawel M. Gradzki, Milford, Conn.

[73] Assignee: Philips Electronics North America Corporation, New York, N.Y.

[21] Appl. No.: 08/833,891

[22] Filed: Apr. 10, 1997

[51] Int. Cl.[6] .................................................. H05B 37/02
[52] U.S. Cl. ........................ 315/247; 315/291; 315/307
[58] Field of Search .................................. 315/291, 224, 315/307, 246, 247, DIG. 5, 308, DIG. 7, 287, 209 R, 219, 200 R

[56] References Cited

U.S. PATENT DOCUMENTS

| | | | |
|---|---|---|---|
| 4,392,086 | 7/1983 | Ide et al. ................................... | 315/174 |
| 4,492,897 | 1/1985 | Sairanen et al. ......................... | 315/219 |
| 4,651,060 | 3/1987 | Clark ........................................ | 315/199 |
| 4,704,563 | 11/1987 | Hussey .................................... | 315/307 |
| 4,716,409 | 12/1987 | Hart et al. ............................... | 340/825 |
| 4,797,599 | 1/1989 | Ference et al. ......................... | 315/194 |
| 4,866,350 | 9/1989 | Counts .................................... | 315/209 |
| 4,952,849 | 8/1990 | Fellows et al. ......................... | 315/307 |
| 5,001,386 | 3/1991 | Sullivan et al. ........................ | 315/219 |
| 5,101,142 | 3/1992 | Chatfield ................................. | 315/308 |
| 5,192,896 | 3/1993 | Qin .......................................... | 315/224 |
| 5,313,142 | 5/1994 | Wong ....................................... | 315/205 |
| 5,365,152 | 11/1994 | Ozawa et al. .......................... | 315/291 |
| 5,404,082 | 4/1995 | Hernandez et al. .................... | 314/210 |

FOREIGN PATENT DOCUMENTS

| | | |
|---|---|---|
| 0471215A1 | 2/1992 | European Pat. Off. . |
| 90149823 | 2/1991 | Germany . |
| 3116698 | 5/1991 | Japan . |
| 2154342 | 9/1985 | United Kingdom . |

OTHER PUBLICATIONS

"A Method to Improve the Performance of Compact Fluorescent Lamps", A.W. Serres et al, Journal of the Illuminating Engineering Society, Summer 1993, pp. 40–48.

*Primary Examiner*—Don Wong
*Assistant Examiner*—David H. Vu
*Attorney, Agent, or Firm*—Bernard Franzblau

[57] ABSTRACT

A compact fluorescent lamp includes a ballast having a control circuit. The control circuit regulates the amount of power supplied to the lamp based on samples representing lamp current and lamp voltage. The sample of lamp voltage supplied to the control circuit is limited so that it cannot drop below a minimum level thereby preventing excessive levels of current from flowing through the lamp at low lamp voltage.

16 Claims, 4 Drawing Sheets

COMPACT FLUORESCENT LAMP WITH OVERCURRENT PROTECTION

BACKGROUND OF THE INVENTION

This invention relates generally to a compact fluorescent lamp, and more particularly to a compact fluorescent lamp with overcurrent protection.

In amalgam lamps, such as a compact fluorescent lamp, the lamp voltage drops substantially when the amalgam temperature exceeds a predetermined level. The mercury vapor pressure is reduced causing the lamp voltage to drop. Under such conditions, regulation of lamp power, such as disclosed in U.S. application Ser. No. 08/642,318, can result in extremely high lamp currents and consequential destruction of the lamp electrodes and shortening of lamp life.

Accordingly, it is desirable to provide an improved compact fluorescent lamp which protects against excessive lamp current when regulating lamp power. The improved compact fluorescent lamp should particularly limit the maximum level of lamp current when lamp voltage is low.

SUMMARY OF THE INVENTION

Generally speaking, in accordance with a first aspect of the invention, a ballast for powering a load having a lamp includes switching circuitry responsive to driving signals for switching into conductive and nonconductive states whereby power is delivered to the load such that a voltage is applied to and current flows through the lamp. The ballast also includes control circuitry for producing the driving signals based on a lamp power signal and including a multiplier for generating the lamp power signal which is proportional to the product of lamp current and a signal representing lamp voltage whereby the power delivered to the load is regulated. The control circuitry includes a first input for receiving the signal representing lamp voltage and a protection scheme for establishing a prefixed minimum level for the signal thereby setting a prefixed maximum level for lamp current.

An acceptable level of lamp current is maintained by the protection scheme. The extremely high lamp currents and consequential destruction of lamp electrodes and shortening of lamp life when regulating lamp power is thereby avoided. The protection scheme can include a voltage clamp connected to the first input. The control circuitry also can include a second input at a supply voltage, the voltage clamp applying a voltage to the first input substantially equal to the supply voltage at the second input. A voltage source is typically connected to the second input for powering the control circuitry. It is a feature of this first aspect of the invention that the voltage clamp include a diode connected between the second input and the first input.

In accordance with a second aspect of the invention, a method for controlling the power delivered by a ballast to a lamp includes the steps of supplying a signal representing lamp voltage to a first input of a control circuit; establishing a prefixed minimum level for the signal; generating driving signals from the control circuit based on a lamp power signal produced by a multiplier, the lamp power signal being proportional to the product of lamp current and the signal representing lamp voltage; and switching a pair of transistors configured in a totem pole arrangement into conductive and nonconductive states in response to the driving signals whereby power delivered to the lamp is regulated and whereby a prefixed maximum level for lamp current is set based on the prefixed minimum level of the signal.

It is a feature of this second aspect of the invention that the method also include applying a supply voltage to a second input of the control circuit to power the control circuit wherein establishment of a prefixed minimum level for the signal includes applying a voltage to the first input which is substantially the same as the supply voltage.

Accordingly, it is an object of the invention to provide an improved ballast which includes an overcurrent protection scheme.

It is another object of the invention to provide an improved compact fluorescent lamp which protects against excessive lamp current when regulating lamp power.

It is a further object of the invention to provide an improved ballast which limits the maximum level of lamp current when lamp voltage is low.

Still other objects and advantages of the invention will, in part, be obvious and will, in part, be apparent from the specification.

The invention accordingly comprises several steps in a relation of one or more of such steps with respect to each of the others, and the device embodying features of construction, a combination of elements and arrangement of parts which are adapted to effect such steps, all as exemplified in the following detailed disclosure in which the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
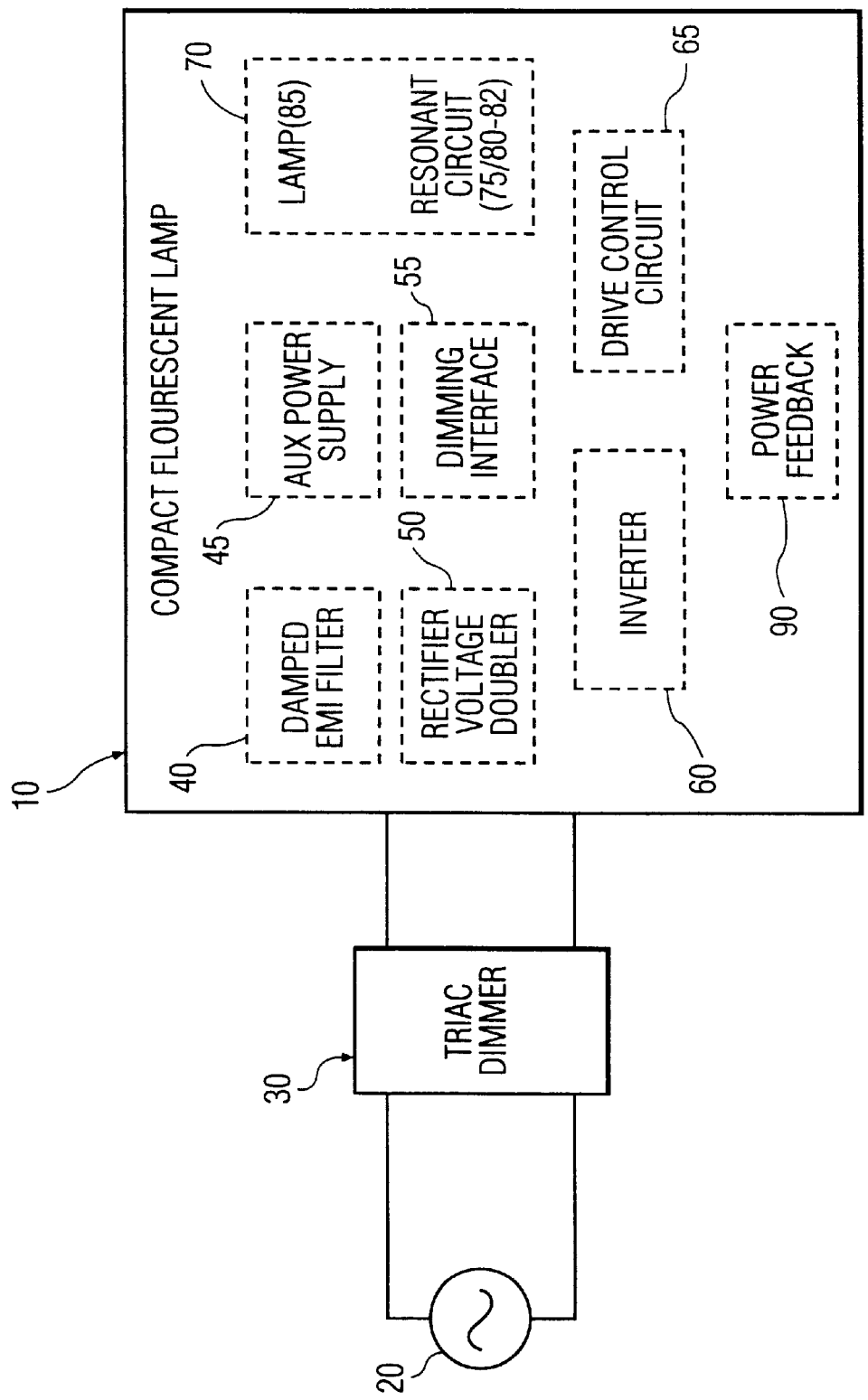
FIG. 1 is a block diagram of a triac dimmable compact fluorescent lamp in accordance with the invention.

As shown in FIG. 1, a compact fluorescent lamp (CFL) 10 is supplied through a triac dimmer 30 from an A.C. power line represented by an A.C. source 20. Compact fluorescent lamp 10 includes a damped electromagnetic interference (EMI) filter 40, an auxiliary power supply 45, a rectifier/voltage doubler 50, a dimming interface 55, an inverter 60, a drive control circuit 65, a load 70 and a power feedback circuit 90. The output of inverter 60, which serves as the output for the ballast of CFL 10, is connected to load 70. Load 70 includes a lamp 85 and a resonant tank circuit formed from a primary winding 75 of a transformer T and a plurality of capacitors 80, 81 and 82. The damped EMI filter 40 significantly dampens harmonics (i.e. oscillations) generated by inverter 60. Rectifier/voltage doubler 50 rectifies the sinusoidal voltage supplied by A.C. source 20 resulting in a D.C. voltage with ripple which is boosted and made into a substantially constant D.C. voltage supplied to inverter 60. Those portions of compact fluorescent lamp 10 other than lamp load 70 are commonly grouped together and referred to as forming a ballast for powering the lamp load 70.

Inverter 60 is driven by drive control circuit 65 at a varying switching frequency based on the level of illumination desired. The D.C. voltage is converted by inverter 60 into a square wave voltage waveform applied to load 70. The level of lamp illumination can be increased and decreased by decreasing and increasing the frequency of this square wave voltage waveform, respectively.

The desired level of lamp illumination is set by triac dimmer 30 and is communicated to drive control circuit 65 through a dimming interface 55. Power feedback circuit 90 feeds a portion of the power from the resonant tank circuit back to the voltage doubler resulting in only minimal power factor correction being necessary to sustain triac conduction after firing. Auxiliary power supply 45 provides power to drive control 65 to supplement the supply of power to drive control 65 when the rail voltage for inverter 60 momentarily drops in meeting load demand.

Triac Dimmer 30

Figure 2:
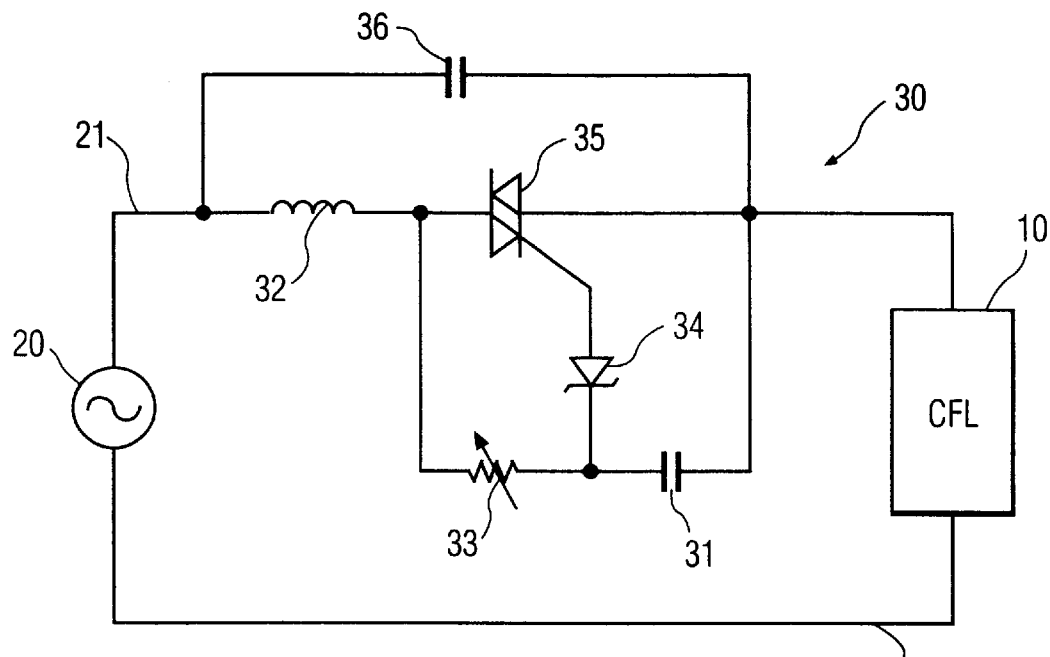
FIG. 2 is a schematic of a triac dimmer as shown in FIG. 1.

As shown in FIG. 2, triac dimmer 30 is connected across A.C. source 20 through a pair of lines 21 and 22. Triac dimmer 30 includes a capacitor 31 which is charged through the serial combination of an inductor 32 and a variable resistor 33. A diac 34 is connected to the gate of a triac 35. When the voltage on capacitor 31 reaches the voltage breakdown of diac 34, triac 35 fires. Current (i.e. latching current of triac 35) is supplied to CFL 10 through inductor 32 and triac 35. At the end of the 60 Hz, ½ wave cycle, the level of current in triac 35 decreases below its holding current (i.e. minimum anode current necessary to sustain conduction of triac 35). Triac 35 turns off. The firing angle, that is, the angle between 0 and 180 degrees at which triac 35 first conducts, can be adjusted by changing the resistance of variable resistor 33. Variable resistor 33 can be, but is not limited to, a potentiometer. The maximum firing angle is limited by the breakdown voltage of diac 34. Inductor 32 limits the rise or fall time of di/dt and thus protects triac 35 from a sudden change in current. A capacitor 36 serves as a snubber and prevents flicker especially when the length of wiring between triac 35 and CFL 10 is relatively long. Harmonics introduced by the inductance and parasitic capacitance associated with such long wiring are bypassed by capacitor 36. Consequently, the level of triac current and the operation of triac 35 are not affected by the length of wiring between triac 35 and CFL 10. Flicker of lamp 85 through such harmonics is avoided.

Triac dimmer 30 has two minimum dim settings defined by/relative to CFL 10. The first minimum dim setting (i.e. minimum turn on dim setting) is the lowest dim setting possible to turn on lamp 85. The second minimum dim setting (i.e. minimum steady state dim setting), which is at a larger cut-in angle than the cut-in angle at the minimum turn on dim setting, can be moved to after lamp 85 has reached its steady state operation. To ensure flicker free operation, the power drawn by CFL 10 during preheat when at the minimum turn on dim setting must be greater than the power drawn during steady state operation at settings between minimum turn on and minimum steady state. CFL 10 in combination with triac dimmer 30 when at the minimum turn on dim setting during preheat will draw more current than after preheat whereby CFL 10 can complete preheat operation and operate in a steady state mode.

Damped EMI Filter 40

Figure 3:
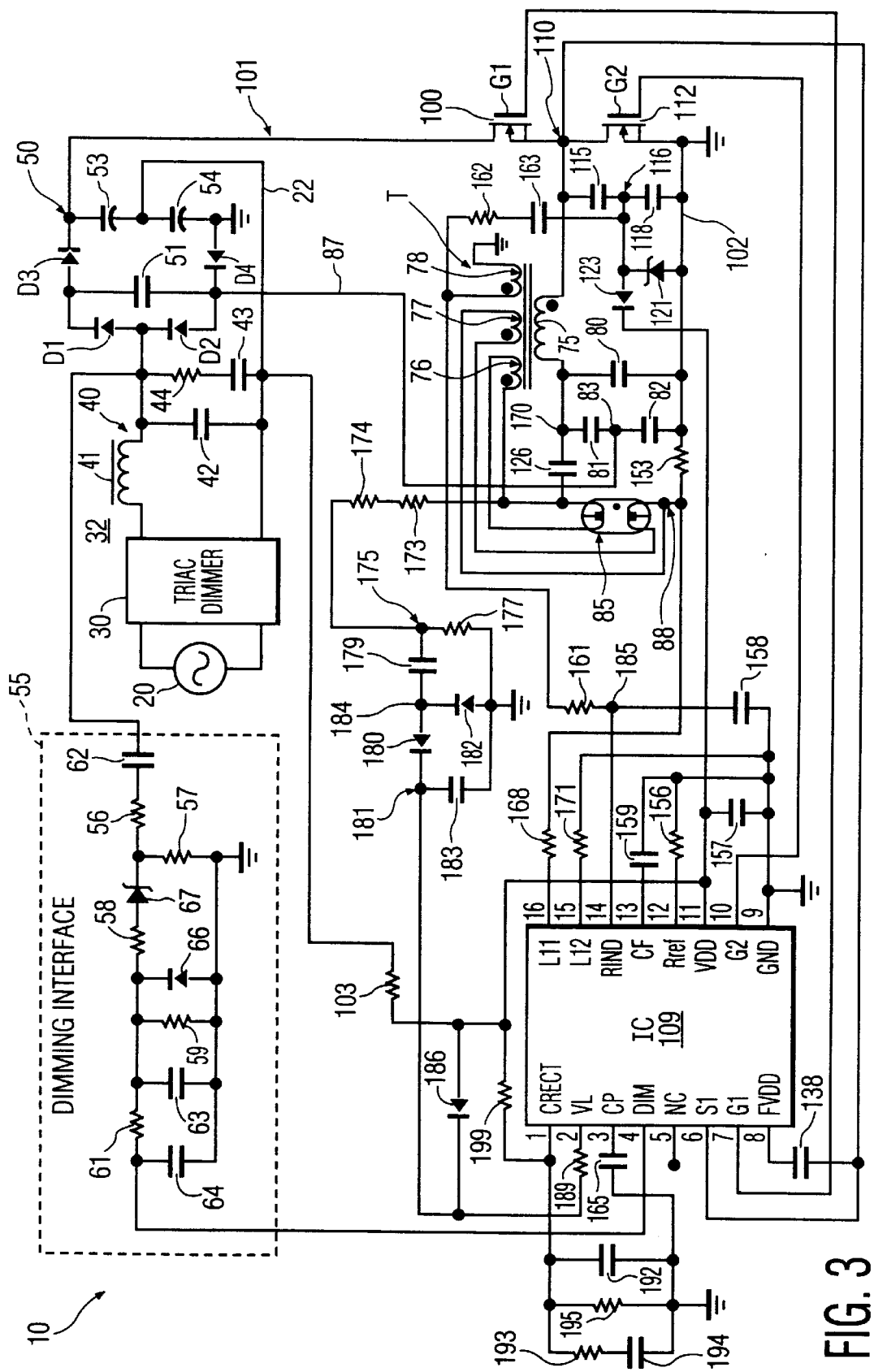
FIG. 3 is a schematic of a compact fluorescent lamp.

As shown in FIG. 3, the damped EMI filter 40 includes an inductor 41, a pair of capacitors 42 and 43 and a resistor 44. Resistor 44 and capacitor 43, which form a snubber, are serially connected across the output of the damped EMI filter. This snubber dampens oscillations produced by ESU filter 40 as triac 35 is turned on. These oscillations, if not dampened by the snubber formed by resistor 44 and capacitor 43, would decrease the level of current flowing through triac 35 to below its holding current resulting in triac 35 being turned off. Resistor 44 and capacitor 43 also provide a path to avoid large dissipation by filter 40 of 60 Hz power.

Rectifier/Voltage Doubler 50

The rectifier and voltage doubler, which form a cascade half-wave voltage doubler rectifier, includes a pair of diodes D1 and D2 and a pair of capacitors 53 and 54. Diodes D1 and D2 rectify the sinusoidal voltage provided by the damped EMI filter resulting in a D.C. voltage with ripple. Capacitors 53 and 54 together serve as a buffer capacitor boosting and making the rectified sinusoidal voltage into a substantially constant D.C. voltage supplied to inverter 60.

A capacitor 51 and a pair of diodes D3 and D4 provide a high frequency power feedback signal from the resonant tank circuit to be further discussed below. The high frequency power feedback signal switches diode D1 and diode D3 between conductive and non-conductive states during the positive half cycle of the 60 Hz waveform. Similarly, the high frequency power feedback signal switches diode D2 and diode D4 between conductive and non-conductive states during the negative half cycle of the 60 Hz waveform. The power feedback derived from the resonant tank circuit (i.e. winding 75 and capacitors 80, 81 and 82) maintains the level of current through triac 35 above its holding current. Conduction of triac 35 can be sustained during a substantial portion of the 60 Hz, ½ cycle (i.e. about more than 0.5 millisecond).

Dimming Interface 55

Dimming interface 55 provides an interface between the output of EMI filter 40 and drive control circuit 65. The angle at which triac 35 fires, that is, the cut-in angle represents the level of illumination desired. Dimming interface 55 converts the cut-in angle (i.e. translates the conduction pulse width of triac 35) into a proportional average rectified voltage (i.e. dimming signal) compatible with and supplied to a DIM pin of an integrated circuit (IC 109) within drive control circuit 65.

Dimming interface 55 includes a plurality of resistors 56, 57, 58, 59 and 61; capacitors 62, 63 and 64; a diode 66 and a zener diode 67. IC 109 is referenced to a circuit ground. The voltage sampled by dimming interface 55, which is supplied to the DIM pin of IC 109, however, is shifted by a DC component. This DC component is equal to half the buffer capacitor voltage of the voltage doubler, that is, the voltage across capacitor 54. Capacitor 62 filters out this DC component. Capacitor 62 is also relatively large in size to accommodate the line frequency. A pair of resistors 56 and 57 form a voltage divider which together with a zener diode 67 determine the scaling factor which is applied in producing the dimming signal. Resistors 56 and 57 also provide a discharge path for capacitor 62. The average rectified voltage applied to the DIM pin is reduced by the zener votage of zener diode 67. Zener diode 67 therefore limits the maximum average rectified voltage (corresponding to full light output) applied to the DIM pin. Variations in the maximum average rectified voltage arising from differences in the minimum cut-in angle of different triac dimmers are limited by zener diode 67 to within a range of voltages which can be readily interpreted by IC 109. In other words, zener diode 67 establishes a minimum cut-in angle (e.g. 25–30 degrees) corresponding to a maximum level for the dimming signal.

Zener diode 67 also limits the maximum firing (cut-in) angle of triac 35 during the positive half cycle of the 60 Hz waveform (e.g. to about 150 degrees). The firing angle is adjusted based on the values selected for resistors 56 and 57 and the breakdown voltage of zener diode 67. Above a certain firing angle (e.g. above 150 degrees), the rail voltage of bus 101 is too low to develop a sufficient voltage at pin VDD to power IC 109. Inverter 60 is therefore unable to operate and lamp 85 remains unlit.

Most triac dimmers have a minimum firing (cut-in) angle of 25 to 30 degrees which corresponds to full light output. At these small cut-in angles the maximum average rectified voltage will be applied to a capacitor 64. A plurality of resistors 56, 57, 58 and 59 and zener diode 67 influence the dimming curve and in particular determine the maximum firing angle at which lamp 85 provides full light output. That is, resistors 56, 57, 58 and 59 and zener diode 67 determine the average rectified voltage which is sensed by the DIM pin of IC 109 based on the chosen firing angle of triac 35. The circuit for averaging the rectified voltage is provided by resistor 61 and capacitor 64. A capacitor 63 filters the high frequency components of the signal applied to resistor 61 and capacitor 64.

During the negative half cycle of the 60 Hz waveform, a diode 66 limits the negative voltage applied to the averaging circuit (resistor 61, capacitor 64) to a diode drop (e.g. about 0.7 volts). In an alternative embodiment, a zener diode (not shown) can be used in place of diode 66 to improve regulation. Zener diode 66' will clamp the voltage applied to the DIM pin such that the desired light level can be determined based on the duty cycle of the voltage rather than on the average rectified voltage. For example, when the cut-in angle is set to about 30 degrees for maximum light output of lamp 85, the duty cycle would correspond to somewhat less than 50%. As the cut-in angle increases in order to decrease the light output of lamp 85, the duty cycle would decrease.

Inverter 60

Inverter 60 is configured as a half-bridge and includes a B+ (rail) bus 101, a return bus 102 (i.e. circuit ground) a pair of switches (e.g. power MOSFETs) 100 and 112 which are serially connected between bus 101 and bus 102. Switches 100 and 112 are joined together at a junction 110 and commonly identified as forming a totem pole arrangement. The MOSFETs serving as switches 100 and 112 have a pair of gates G1 and G2, respectively. A pair of capacitors 115 and 118 are joined together at a junction 116 and serially connected between junction 110 and bus 102. A zener diode 121 is connected in parallel to capacitor 118. A diode 123 is connected between a pin VDD of IC 109 and bus 102 junction point 116.

Winding 75, capacitor 80, a capacitor 81, and a DC blocking capacitor 126 are joined together at a junction 170. A pair of secondary windings 76 and 77 of transformer T are coupled to primary winding 75 for application of voltages across the filaments of lamp 85 in conditioning the latter during the preheat operation and when operating lamp load 85 at less than full light output. Capacitors 80, 82, 118, zener diode 121, switch 112 and a resistor 153 are connected together to a circuit ground. Lamp 85, resistor 153 and a resistor 168 are joined together at a junction 88. A pair of resistors 173 and 174 are serially connected between a junction 175 and the junction joining lamp 85 and capacitor 126 together. Capacitors 81 and 82 are serially connected together and are joined at a junction 83. Capacitor 51 of rectifier and voltage doubler 50 is connected to junction 83. A resistor 177 is connected between node 175 and circuit ground. A capacitor 179 is connected between junction 175 and a junction 184. A diode 182 is connected between junction 184 and circuit ground. A diode 180 is connected between junction 184 and a junction 181. A capacitor 183 is connected between junction 181 and circuit ground.

Drive Control Circuit 65

Drive control circuit 65 includes IC 109. IC 109 includes a plurality of pins. A pin RIND is connected to junction 185. A capacitor 158 is connected between junction 185 and circuit ground. A pair of resistors 161 and 162 and a capacitor 163 are serially connected between junction 185 and junction 116. The input voltage at pin RIND reflects the level of current flowing through winding 75. The current flowing through winding 75 is obtained by first sampling the voltage across a secondary winding 78 of transformer T. The sampled voltage, which is proportional to the voltage across winding 75, is then integrated by an integrator formed by resistor 161 and capacitor 158. The integrated sampled voltage supplied to pin RIND is representative of the current flowing through winding 75. Reconstructing the current flowing through winding 75 by first sampling and then integrating the voltage of winding 78 results in far less power losses than conventional schemes (e.g. sensing resistors) in sensing the current flow through the resonant inductor. It would also be far more difficult to reconstruct the current flowing through winding 75 otherwise since this current is split between lamp 85, resonant capacitors 80, 81 and 82 and a power feedback line 87.

VDD supplies the start-up voltage for driving IC 109 by connection to line 22 through a resistor 103. A pin LI1 is connected through a resistor 168 to junction 88. A pin LI2 is connected through a resistor 171 to a circuit ground. The difference between the currents inputted to pins LI1 and LI2 reflects the sensed current flowing through lamp 85. The voltage at a pin VL, which is connected through a resistor 189 to junction 181, reflects the peak voltage of lamp 85. The current flowing out of a CRECT pin into circuit ground through a parallel RC network of a resistor 195 an a capacitor 192 and the serial RC network of a resistor 193 and a capacitor 194 reflects the average power of lamp 85 (i.e. the product of lamp current and lamp voltage). An optional external D.C. offset, explained in greater detail below, includes a serial combination of VDD and a resistor 199 which results in a D.C. offset current flowing to circuit ground through the resistor 195.

Capacitor 192 serves to provide a filtered D.C. voltage across resistor 195. A resistor 156 is connected between a pin RREF and a circuit ground and serves to set the reference current within IC 109. A capacitor 159, which is connected between a CF pin and circuit ground, sets the frequency of a current controlled oscillator (CCO) discussed in greater detail below. A capacitor 165, which is connected between a CP pin and a circuit ground, is employed for timing of both the preheat cycle and the non-oscillating/standby mode as discussed below. A GND pin is connected directly to a circuit ground. A pair of pins G1 and G2 are connected directly to gates G1 and G2 of switches 100 and 112, respectively. A pin S1, which is connected directly to junction 110, represents the voltage at the source of switch 100. A pin FVDD is connected to junction 110 through a capacitor 138 and represents the floating supply voltage for IC 109.

Operation of inverter 60 and drive control circuit 65 is as follows. Initially (i.e. during startup), as capacitor 157 is charged based on the RC time constant of resistor 103 and capacitor 157, switches 100 and 112 are in nonconducting and conducting states, respectively. The input current flowing into pin VDD of IC 109 is maintained at a low level (less than 500 microamp) during this startup phase. Capacitor 138, which is connected between junction 110 and pin FVDD, charges to a relatively constant voltage equal to approximately VDD and serves as the voltage supply for the drive circuit of switch 100. When the voltage across capacitor 157 exceeds a voltage turnon threshold (e.g. 12 volts), IC 109 enters its operating (oscillating/switching) state with switches 100 and 112 each switching back and forth between their conducting and nonconducting states at a frequency well above the resonant frequency determined by winding 75 and capacitors 80, 81 and 82.

IC 109 initially enters a preheat cycle (i.e. preheat state) once inverter 60 begins oscillating. Junction 110 varies between about 0 volts and the voltage on bus 101 depending on the switching states of switches 100 and 112. Capacitors 115 and 118 serve to slow down the rate of rise and fall of voltage at junction 110 thereby reducing switching losses and the level of EMI generated by inverter 60. Zener diode 121 establishes a pulsating voltage at junction 116 which is applied to capacitor 157 by diode 123. A relatively large operating current of, for example, 10–15 milliamps thus is supplied to pin VDD of IC 109. Capacitor 126 serves to block the D.C. voltage component from being applied to lamp 85.

During the preheat cycle lamp 85 is in a nonignited state, that is, no arc has been established within lamp 85. The initial operating frequency of IC 109, which is about 100 kHz, is set by resistor 156 and capacitor 159 and the reverse diode conducting times of switches 100 and 112. IC 109 immediately reduces the operating frequency at a rate set internal to the IC . The reduction in frequency continues until the peak voltage across the RC integrator formed by resistor 161 and capacitor 158 as sensed at the RIND pin is equal to −0.4 volts (i.e. the negative peak voltage equal to 0.4 volts). The switching frequency of switches 100 and 112 is regulated so as to maintain the voltage sensed by the RIND pin equal to −0.4 volts, which results in a relative constant frequency of about 80–85 kHz (defined as the preheat frequency) at junction 110. A relatively constant RMS current flows through winding 75 which through coupling to windings 76 and 77 permits the filaments (i.e. cathodes) of lamp 85 to be sufficiently preconditioned for subsequent ignition of lamp 85 and to maintain long lamp life. The duration of the preheat cycle is set by capacitor 165. When the value of capacitor 165 is zero (i.e. open), there is effectively no preheating of the filaments resulting in an instant start operation of lamp 85.

At the end of the preheat operation, as determined by capacitor 165, pin VL assumes a low logic level. Pin VL is at a high logic level during preheat. IC 109 now starts sweeping down from its switching frequency at preheat at a rate set internal to IC 109 toward an unloaded resonant frequency (i.e. resonant frequency of winding 75 and capacitors 80, 81 and 82 prior to ignition of lamp 85-e.g. 60 kHz). As the switching frequency approaches the resonant frequency, the voltage across lamp 85 rises rapidly (e.g. 600–800 volts peak) and is generally sufficient to ignite lamp 85. Once lamp 85 is lit, the current flowing therethrough rises from a few milliamps to several hundred milliamps. The current flowing through resistor 153, which is equal to the lamp current, is sensed at pins LI1 and LI2 based on the current differential therebetween as proportioned by resistors 168 and 171, respectively. The voltage of lamp 85, which is scaled by the voltage divider combination of resistors 173, 174 and 177, is detected by a peak to peak detector formed from diodes 180 and 182 and capacitor 183 resulting in a D.C. voltage, proportional to the peak to peak lamp voltage, at junction 181. The voltage at junction 181 is converted into a current by resistor 189 flowing into pin VL. The current flowing into pin VL is multiplied inside IC 109 with the differential currents between pins LI1 and LI2 resulting in a rectified A.C. current fed out of pin CRECT into the parallel RC network of capacitor 192 and resistor 195 and series RC network of resistor 193 and capacitor 194. These parallel and series RC networks convert the A.C. rectified current into a D.C. voltage which is proportional to the power of lamp 85. The voltage at the CRECT pin is forced to be equal to the voltage at the DIM pin by a feedback circuit/loop contained within IC 109. Regulation of power consumed by lamp 85 results.

The desired level of illumination of lamp 85 is set by the voltage at the DIM pin. The feedback loop includes a lamp voltage sensing circuit and a lamp current sensing circuit discussed in greater detail below. The switching frequency of half-bridge inverter 60 is adjusted based on this feedback loop whereby the CRECT pin voltage is made equal to the voltage at the DIM pin. The CRECT voltage varies between 0.3 and 3.0 volts. Whenever the voltage at the DIM pin rises above 3.0 volts or falls below 0.3 volts, it is clamped internally to 3.0 volts or 0.3 volts, respectively. The signal provided at the DIM pin is generated through phase angle dimming in which a portion of the phase of the A.C. input line voltage is cut off. The cut-in phase angle of the input line voltage is converted into a D.C. signal through dimming interface 55 and is applied to the DIM pin.

The voltage at the CRECT pin is zero when lamp 85 ignites. As lamp current builds up, the current generated at the CRECT pin, which is proportional to the product of lamp voltage and lamp current, charges capacitors 192 and 194. The switching frequency of inverter 60 decreases or increases until the voltage at the CRECT pin is equal to the voltage at the DIM pin. When the dim level is set to full (100%) light output, capacitors 192 and 194 are permitted to charge to 3.0 volts and therefore the CRECT pin voltage rises to 3.0 volts based on the feedback loop. During the rise in voltage, the feedback loop, discussed in greater detail below, is open. Once the CRECT pin voltage is at about 2.9 volts, the feedback loop closes. Similarly, when the dim level is set to minimum light output, capacitors 192 and 194 are permitted to charge to 0.3 volts and therefore the CRECT pin voltage rises to 0.5 volts based on the feedback loop. Generally, 0.3 volts at the DIM pin corresponds to 10% of full light output. For deep dimming down to 1% of full light output, external offset provided by resistor 199, which is otherwise not required can be employed such that 0.3 volts at the DIM pin corresponds to 1% of full light output. When the dim level is set to the minimum light output, the CRECT capacitor charges to 0.3 volts before the feedback loop closes.

Conventional lamps which are set to dim upon ignition typically exhibit an ignition flash. The flash of light, which is above the level of illumination desired, is produced by supplying a high level of power to the lamp for a relatively long and unnecessary period after ignition (e.g. up to a few seconds). In this way, conventional compact fluorescent lamp ignition schemes ensure successful ignition of the lamp. In accordance with the invention, however, ignition flashes are minimized. The duration of a high light condition following ignition is very short for low dim settings and the visual impact of the undesired light flash is minimized. Substantial avoidance of ignition flashes is achieved by reducing the power level supplied to lamp 85 immediately after ignition takes place through use of the feedback loop.

Overcurrent Protection

In amalgam lamps, the lamp voltage drops substantially when the amalgam temperature exceeds a predetermined level. The mercury vapor pressure is reduced causing the lamp voltage to drop. Under such conditions, regulation of lamp power will result in extremely high lamp currents and consequential destruction of the lamp electrodes and shortening of lamp life. In accordance with the invention, an acceptable level of lamp current is maintained by clamping the minimum voltage at junction 181 equal to the VDD pin voltage less the voltage drop of a diode 186. The voltage of lamp 85, which is scaled by the voltage divider combination of resistors 173, 174 and 177, is detected by a peak to peak detector formed from diodes 180 and 182 and capacitor 183 resulting in a D.C. voltage, proportional to the peak to peak lamp voltage, at junction 181.

The voltage at junction 181, which is converted into a current by resistor 189 flowing into pin VL, is maintained equal to no less than the VDD pin voltage less the voltage drop of diode 186. Since IC 109 regulates lamp power and by clamping sampled lamp voltage to a minimum value, the lamp current is limited to an acceptable maximum level.

Auxiliary Power Supply

An auxiliary power supply, which is formed by secondary winding 78 of transformer T, resistor 162 and capacitor 163, is provided to avoid flicker. Flicker is caused by IC 109 turning off momentarily due to the voltage level at pin VDD falling below a minimum threshold required to power IC 109. As lamp 85 is turning on, CFL 10 draws more current which can cause the voltage supplied by bus 101 to momentarily dip. Since the voltage at pin VDD is based on the voltage supplied by bus 101, a momentary reduction in the voltage level at pin VDD below this minimum threshold will result in flicker.

The auxiliary power supply supplements the main power supply. The main power supply, established by zener diode 121, provides a pulsating voltage to capacitor 157 in charging the latter. The VDD pin voltage is set by and equal to the voltage across capacitor 157. The auxiliary power supply provides a rectified voltage, after but not during preheat, which is applied to pin VDD by coupling the voltage across winding 78 through resistor 162, capacitor 163 and diode 123. The auxiliary power supply provides a DC offset to pin VDD which ensures that the voltage at pin VDD is maintained above a minimum threshold of about 10 volts to power IC 109. The momentary interruption of light produced by lamp 85 (i.e. flicker) due to the increased load as lamp 85 is turning on is thereby avoided.

Power Feedback

Power is fedback to rectifier/voltage doubler 50 along power feedback line 87 from junction 83 to the junction joining diodes D2 and D4 and capacitor 51 together. In order to lower the overboost voltage supplied by rectifier/voltage doubler 50 to lamp 85 and increase the amount of current during ignition and dimming conditions, the capacitance represented by capacitors 81 and 82 of the resonant tank circuit has been split therebetween. Feedback current flows only through capacitor 81 and depends on the ratio of capacitor 81 to capacitor 82. The ratio of capacitor 81 to capacitor 82 depends on the the ratio of lamp voltage (i.e. voltage across lamp 85) to the line voltage (i.e. voltage of A.C. source 20).

Diodes D1 and D3 conduct when the line voltage is positive. Diodes D2 and D4 conduct when the line voltage is negative. During the peak portion of each half cycle of the mains line voltage (i.e. voltage from A.C. source 20), there is no high frequency feedback contribution from capacitor 81. That is, the voltage during the peak portion of each half cycle of the mains line is greater than the voltage at junction 83 such that the high frequency contribution fed into rectifier/voltage doubler 50 is blocked by diodes D2 and D4.

Capacitor 51 is a D.C. blocking capacitor which electrically connects the junction joining diodes D1 and D3 to the junction joining diodes D2 and D4 with respect to the high frequency feedback contribution from capacitor 81. Capacitor 51 thereby ensures that the high frequency feedback contribution is the same (i.e. symmetrical) for both the positive and negative half cyles of the mains line voltage. The amount of feedback varies based on the mains line voltage and dim setting. Capacitors 81 and 82 are effectively in parallel with lamp 85 with respect to the high frequency power being fed back to rectifier/voltage doubler 50. The power being fed back to rectifier/voltage doubler 50 reflects the voltage across the lamp 85.

The power feedback circuit advantageously permits CFL 10 to operate at a power factor far less than 1.0 (e.g. about 0.7). When the power factor is about 1.0, there is far greater stress on the components within inverter 60 and load 70 than at a lower power factor. The power feedback circuit raises the power factor sufficiently to the minimal level of about 0.7 necessary to sustain conduction of triac 35.

Power Regulation and Dimming Control

Figure 4:
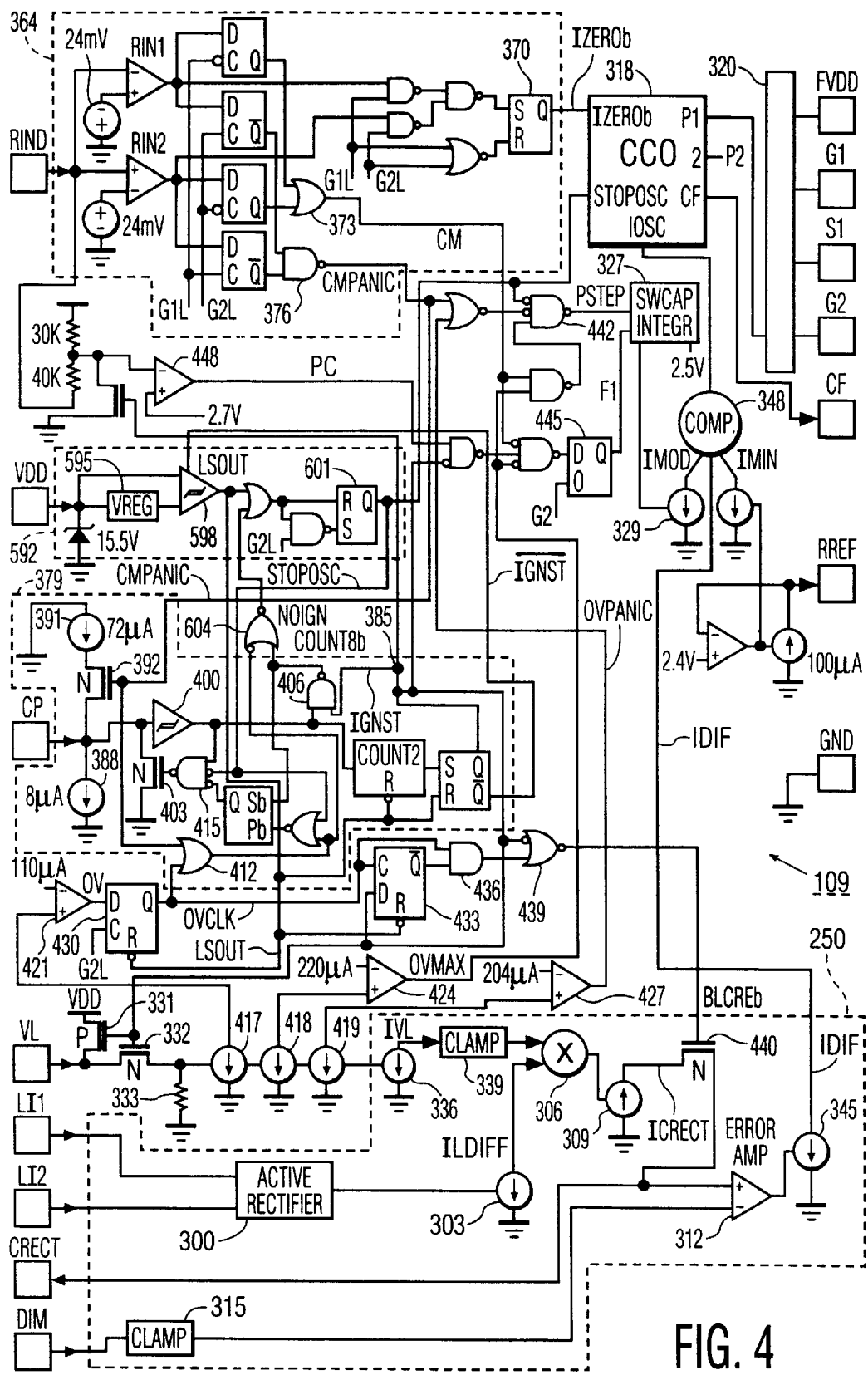
FIG. 4 is a logic block diagram of an integrated circuit which serves as the drive control circuit of FIG. 3.

Turning now to FIG. 4, IC 109 includes a power regulation and dimming control circuit 250. The differential current between pins LI1 and LI2 is supplied to an active rectifier 300. Active rectifier 300 full wave rectifies the A.C. waveform by employing an amplifier with internal feedback rather than a diode bridge to avoid any voltage drop normally associated with diodes. A current source 303 in response to the output of active rectifier 300 generates a rectified current ILDIFF representing the flow of current through lamp 85 which is supplied as one of two inputs to a current multiplier 306.

A P channel MOSFET 331 is turned on and an N-channel MOSFET 332 is turned off during preheat so as to pull the VL pin up to the voltage potential of pin VDD. At the end of preheat cycle (e.g. 1 second in duration), P channel MOSFET 331 is turned off and N channel MOSFET 332 is turned on to permit power regulation and dim control operation of inverter 60 to take place. Current following the preheat cycle flows through the VL pin and N channel MOSFET 332 and is scaled by a resistor 333. A current source (i.e. current amplifier) 336 in response to the scaled current from the VL pin produces a current signal IVL. A current clamp 339 limits the maximum level of current signal IVL which is fed into the other input of multiplier 306. A current source 309 outputs a current ICRECT in response to the output of multiplier 306 which is fed into both the CRECT pin and the noninverting input of an error amplifier 312. As shown in FIG. 3, the parallel network of capacitor 192 and resistor 195 in parallel with the series combination of resistor 193 and capacitor 194 converts the A.C. rectified current at the CRECT pin into a D.C. voltage.

Referring once again to FIG. 4, a D.C. voltage at the DIM pin is applied to a voltage clamp circuit 315. Voltage clamp circuit 315 limits the voltage at the CRECT pin between 0.3 and 3.0 volts. The output of voltage clamp circuit 315 is supplied to the inverting input of error amplifier 312. The output of the error amp 312 controls the level of current IDIF flowing through a current source 345. A current comparator 348 compares current IDIF with a reference current IMIN and a current IMOD and outputs the current signal of greatest magnitude. The IMOD current is controlled by a switch capacitor integrator 327. The current outputted by current comparator 348 provides a control signal which determines the oscillation (switching) frequency at which VCO 318 oscillates. When the lamp ignites, the CRECT pin voltage and IDIF current are zero. The output of the comparator 348 selects the maximum current level from among IMIN, IDIF and IMOD which is IMOD. As the CRECT pin voltage builds up to the voltage at the DIM pin, the IDIF current increases. When the IDIF current exceeds the IMOD current, the output of comparator 348 is equal to the IDIF current.

The feedback loop is centered about error amplifier 312 and includes many components internal and external to IC 109 in making the voltage at the CRECT pin equal to the voltage at the DIM pin. When the voltage at the DIM pin is below 0.3 volts, a D.C. voltage of 0.3 volts is applied to the inverting input of error amplifier 312. When the voltage at the DIM pin exceeds 3.0 volts, 3.0 volts is applied to error amplifier 312. The voltage applied to the DIM pin should range from and including 0.3 volts to and including 3.0 volts to achieve a desired ratio of 10:1 between the maximum and minimum light levels of lamp 85. Input to multiplier 306 is clamped by current clamp 339 to provide proper scaling of the current into multiplier 306.

Current Control Oscillator 318

The frequency of CCO 318 in response to the output of comparator 348 controls the switching frequency of half bridge inverter 60. Comparator 348 supplies the IMOD current to CCO 318 during preheat and ignition sweep. Comparator 348 outputs to CCO 318 the IDIF current during steady state operation. CCO 318 in response to the IMIN current when outputted by comparator 348 limits the minimum switching frequency The minimum switching frequency is also based on capacitor 159 and resistor 156 which are connected external to IC 109 at pins CF and RREF, respectively. Inverter 60 reaches closed loop operation when the CRECT pin voltage is at the same voltage as the DIM pin voltage. Error amplifier 312 adjusts the IDIF current outputted by comparator 348 so as to maintain the CRECT pin voltage about equal to the DIM pin voltage.

Resonant Inductor Current Sense Circuit

A resonant inductor current sense circuit monitors the current of the resonant inductor, as represented by the signal at the RIND pin, in determining whether inverter 60 is in or near the capacitive mode of operation. Inverter 60 is in the capacitive mode of operation when the current flowing through winding 75 leads the voltage across switch 112. In the near capacitive mode of operation, the current flowing through winding 75 is close to but does not yet lead the voltage across switch 112. For example, given a resonant frequency based on winding 75 and capacitors 80, 81 and 82 of about 50 kHz, a near capacitive mode of operation exists when the current flowing through winding 75 lags behind but is within about 1 microsecond of the voltage across switch 112.

Circuit 364 also detects whether forward conduction or body diode conduction (from the substrate to the drain) of switch 100 or 110 takes place. A signal IZEROb produced by resonant inductor current sense circuit 364, that is, signal IZEROb produced at the Q output of a flip-flop 370 is at a high logic level when either switch 100 or 112 is in forward conduction and at a low logic level when the body diode of switch 100 or 112 conducts. Signal IZEROb is supplied to an IZEROb pin of CCO 318. When signal IZEROb is at a low logic level, the waveform at the CF pin 379 is substantially at a constant level. When signal IZEROb is at a high logic level and switch 100 is conducting, the voltage at the CF pin is rising. When signal IZEROb is at a high logic level and the switch 112 is conducting, the voltage at the CF pin is decreasing/falling.

A signal CM produced by resonant inductor current sense circuit 364, that is, signal CM produced by an OR gate 373 is at a high logic level when the switching frequency of inverter 60 is in the near capacitive mode of operation. A switch capacitor integrator 327 based on signal CM being at a high logic level will cause an increase in the output of current source 329 (i.e. IMOD current). The increase in magnitude of the IMOD current results in comparator 348 supplying the IMOD current to VCO 318 whereby an increase in the switching frequency of inverter 60 takes place. The near capacitive mode of operation is detected by resonant inductor current sense circuit 364 by monitoring the sign (+ or −) of the voltage waveform at the RIND pin during the leading (rising) edge of each gate drive pulse produced at pin G1 and G2 of IC 109. When the sign of the voltage wave form at the RIND pin during the leading edge of gate pulse G1 is + (positive) or of gate pulse G2 is − (negative), inverter 60 is in a near capacitive mode of operation.

A NAND gate 376 outputs a CMPANIC signal which is at a high logic level when inverter 60 is operating in the capacitive mode. Once the capacitive mode is detected, the level of the IMOD current rapidly rises in response to the rapid rise in the output of switch capacitor integrator 327. VCO 318 based on the IMOD signal, resistor 156 and capacitor 159 controls a relatively instantaneous rise to the maximum switching frequency of inverter 60. The capacitive mode is detected by monitoring the sign (+ −) of the voltage waveform at the RIND pin during the trailing (falling) edge of each gate drive pulse produced at pin G1 and G2 of IC 109. When the sign of the voltage waveform at the RIND pin during the trailing edge of gate pulse G1 is − (negative) or of gate pulse G2 is + (positive), inverter 60 is in a capacitive mode of operation.

Preheat/Ignition Stop Circuit

A circuit 379 in response to the value of capacitor 165 (connected between pin CP and a circuit ground) sets the times for preheating the filaments of lamp 85 and for placing inverter 60 into a standby mode of operation. During the preheat cycle, 2 pulses (over a 1 second duration) are generated at the CP pin. The switching frequency of inverter 60 during the preheat cycle is about 80 kHz. At the end of the preheat cycle, a signal IGNST assumes a high logic level initiating an ignition start, that is, an ignition sweep in the switching frequency from about 80 kHz to about but above the resonant frequency of winding 75 and capacitors 80, 81 and 82 of, for example, about 60 kHz (unloaded resonant frequency). The ignition sweep can be at a rate, for example, of 10 kHz/milliseconds.

IC 109 regulates the amplitude of current flowing through resonant winding 75 which is sensed at the RIND pin. When the voltage magnitude at the RIND pin exceeds 0.4, a signal PC outputted by a comparator 448 assumes a high logic level causing the output of switch capacitor integrator 327 to adjust the level of the IMOD current. An increase in the RMS switching frequency results which reduces the amplitude of the current flowing through resonant winding 75. When the voltage magnitude at the RIND pin falls below 0.4, signal PC assumes a low logic level causing the output of switch capacitor integrator 327 to adjust the level of the IMOD signal such that the switching frequency decreases. An increase in the current flowing through resonant winding 75 results. A well regulated flow of current through resonant winding 75 is achieved which permits a substantially constant voltage across each filament of lamp 85 during preheat. Alternatively, by including a capacitor (not shown) in series with each filament a substantially constant current flow through the filaments can be achieved during preheat.

Circuit 379 also includes an ignition timer which is initiated following elapse of the preheat cycle. Once activated, 1 pulse is generated at the CP pin. If after this pulse either a capacitive mode of inverter operation or an overvoltage condition across lamp 85 is detected, IC 109 enters a standby mode of operation. During standby, VCO 318 stops oscillating with switches 112 and 100 being maintained in conductive and nonconductive states, respectively. To exit the standby mode of operation, the supply voltage to IC 109 (i.e. supplied to pin VDD) must be reduced to at least or below a turnoff threshold (e.g. 10 volts) and then increased to at least a turnon threshold (e.g. 12 volts).

The preheat timer includes a Schmitt trigger 400 (i.e. a comparator with hysteresis) which sets the tripping points of the CP waveform. These tripping points represent the voltages applied to the input of the Schmitt trigger 400 for triggering the latter on and off. A switch 403 when in a conductive state provides a path for discharge of capacitor 165. Switch 403 is placed in a conductive state whenever and for the duration of each pulse generated by Schmitt trigger 400. Capacitor 165 discharges whenever the voltage at the CP pin exceeds the upper tripping point as established by Schmitt trigger 400. The discharge path includes the CP pin, switch 403 and a circuit ground. Capacitor 165 is charged by a current source 388. When a capacitive mode of operation is detected, as reflected by the generation of a CMPANIC signal at a NAND gate 376, a switch 392 is turned on. Capacitor 165 is now also charged by a current source 391. The current charging capacitor 165 is 10 times higher when the capacitive mode of operation is detected. The voltage at the CP pin reaches the upper tripping point of Schmitt trigger 400 in $\frac{1}{10}$ the time it takes when not in the capacitive mode. The pulse therefore at the CP pin is 10 times shorter when the capacitive mode of operation is detected than when the capacitive mode of operation is not detected. Consequently, IC 109 will enter the standby mode of operation in a relatively short period of time whenever an increase in the switching frequency does not eliminate the capacitive mode condition.

The preheat timer also includes a D-type flip flop forming a counter 397. The output of a NAND gate 406 generates a signal COUNT 8*b* which assumes a low logic level at the end of the ignition period. A gate 412 outputs a high logic level whenever an overvoltage minimum threshold condition (i.e. as represented by the OVCLK signal) across lamp 85 or a capacitive mode of inverter operation (i.e. as represented by signal CMPANIC) has been detected. When the output of a gate 415 assumes a high logic level, switch 403 is turned on resulting in the discharge of capacitor 165.

Overvoltage Protection

As discussed above, following the preheat cycle the input current flowing from the VL pin is fed to multiplier 306 through current source 336 for purposes of power regulation and dimming control. The input current from the VL pin also feeds the noninverting inputs of a comparator 421, 424 and 427 through a current source 417, a current source 418 and a current source 419, respectively.

Comparator 421 in response to detecting that the lamp voltage has exceeded an overvoltage minimum threshold activates the ignition timer. When the overvoltage minimum threshold condition exists following elapse of the ignition timer, IC 109 enters the standby mode of operation. A D type flip-flop 430 clocks the output of comparator 421 at the falling edge of the gate pulse produced at pin G2. The logic combination of a D-type flip-flop 433, an AND gate 436 and a NOR gate 439 cause a switch (an N-channel MOSFET) 440 to open and thereby block the ICRECT signal whenever the overvoltage minimum threshold is exceeded during the first ignition sweep. The flip-flop 433 has its D input tied to an internal node 385. The D input of flip-flop 433 assumes a high logic level at the end of the preheat cycle when an overvoltage minimum condition is detected. The output of flip-flop 433 in response to the high logic level at its D input assumes a low logic level resulting in the output of gate 439 switching to a low logic level. Switch 440 opens thereby blocking the ICRECT signal from reaching the CRECT pin. When the ICRECT signal is blocked from reaching the CRECT pin, capacitor 192 discharges through resistor 195. Full discharge occurs if external offset 198 is not used. Partial discharge occurs when offset 198 is used as shown in FIG. 2. In either event, discharge of capacitor 192 lowers the voltage at the CRECT pin to ensure that the feedback loop does not close. During the preheat cycle, the IGNST signal at internal node 385 is at a low logic level. NOR gate 439 will therefore turn off switch 440 during the preheat cycle. No ICRECT signal will be applied to error amplifier 312 or flow out of the CRECT pin so as to charge capacitor 192.

Once ignition sweep begins, which immediately follows completion of the preheat cycle, the IGNST signal is at a high logic level. Switch 440 will now turn on and remain turned on during ignition sweep unless a overvoltage minimum threshold (e.g. about ½ the maximum voltage which will be applied to lamp 85 during ignition) is detected by comparator 421. During ignition sweep, the switching frequency is decreasing resulting in an increase in voltage across lamp 85 and sensed lamp current. The magnitude of the ICRECT signal increases which charges capacitor 192 resulting in an increase in the voltage at the CRECT pin. At low dim levels, the voltage at the CRECT pin could equal the voltage at the DIM pin. Without further intervention, error amplifier 312 detecting no difference between these two voltages will prematurely close the feedback loop prior to successful ignition of lamp 85.

To avoid the premature closure of the feedback loop, gate 439 during ignition sweep will turn off switch 440 and maintain switch 440 turned off for as long as an overvoltage minimum threshold condition exists as detected by comparator 421. By blocking the ICRECT signal from reaching the CRECT pin, the CRECT pin voltage drops and is thereby prevented from equaling the DIM pin voltage even when the latter is set to a deep dim level. Accordingly, the feedback loop cannot close during ignition sweep and thereby cannot prevent successful ignition from taking place. Preferably, switch 440 is turned off only once during ignition sweep beginning when the lamp voltage reaches the overvoltage minimum threshold and continuing until lamp 85 ignites. While switch 440 is turned off, capacitor 192 can sufficiently discharge through resistor 195 to ensure that the feedback loop will not prematurely close during ignition sweep.

Conventional compact fluorescent lamp driving schemes in order to provide for successful lamp start-up supply a relatively high level of power to the lamp for an undesirably long period of time (e.g. up to several seconds). When attempting to start a lamp at a relatively low level of brightness, the undesirably long period of time at which the relatively high level of power is supplied to the lamp can result in a condition referred to as ignition flash. Under this condition, a momentary flash of light, potentially far brighter than desired, occurs.

In accordance with the invention, ignition flash has been substantially eliminated, that is, has been so minimized as to not be noticed. Substantial elimination of ignition flash has been achieved by avoiding the undesirably long period of time at which the relatively high level of power is supplied to lamp 85. More particularly, lamp 85 is supplied with a relatively high level of power for about 1 millisecond or less before being reduced in magnitude following lamp ignition.

This immediate reduction in lamp power is achieved by monitoring overvoltage conditions and particularly when the lamp voltage drops below the overvoltage minimum threshold (as determined by comparator 421) before permitting switch 440 to close again. This drop in lamp power below the overvoltage minimum threshold occurs immediately upon successful ignition of lamp 85. In other words, at substantial dimming levels where ignition flash can occur, the latter is avoided by first detecting when the lamp voltage has reached and/or exceeded the overvoltage minimum threshold and subsequent thereto when the lamp voltage has dropped below the overvoltage minimum threshold.

The output of comparator 424 assumes a high logic level when the lamp voltage exceeds the overvoltage maximum threshold (e.g. two times the overvoltage minimum threshold). When the output of comparator 424 is at a high logic level without detection of the near capacitive mode, switch capacitor integrator 327 increases the oscillating frequency of VCO 318 and therefore the switching frequency at a fixed rate (e.g. at a sweep rate of 10 kHz/millisec) based on the Q output of a D-type flip-flop 445 assuming a high logic level (i.e. signal FI (frequency increase) outputted by flip-flop 445 being at a high logic level). The time interval of the switching period of inverter 60 is therefore reduced. When the output of comparator 424 is at a high logic level and a near capacitive condition is detected, switch capacitor integrator 327 increases the oscillating frequency of VCO 318 and therefore the switching frequency immediately (e.g. within 10 microseconds) to its maximum value (e.g. 100 kHz) based on the output of a NAND gate 442 assuming a high logic level (i.e. signal FSTEP (frequency step) outputted by NAND gate 442 assuming at a high logic level). The switching period of inverter 60 is reduced to its minimum time interval (e.g. 10 microseconds) in response to VCO 318 now at its maximum oscillating value.

The output of comparator 427 assumes a high logic level when the lamp voltage exceeds an overvoltage panic threshold (i.e. above the overvoltage maximum threshold). When the output of comparator 427 is at a high logic level, switch capacitor integrator 327 increases the switching frequency of VCO 318 immediately to its maximum value based on the output of a NAND gate 442 assuming a high logic level (i.e. signal FSTEP (frequency step) outputted by NAND gate 442 assuming a high logic level).

Gate Driving Circuit

Gate driving circuit 320 is well known in the art and is more fully described in U.S. Pat. No. 5,373,435. The description of the gate driving circuit in U.S. Pat. No. 5,373,435 is incorporated herein by reference thereto. Pins FVDD, G1, S1 and G2 of IC 109 correspond to nodes P1, P2, P3 and GL as shown in FIG. 1 of U.S. Pat. No. 5,373,435. Signals G1L and G2L shown in FIG. 3 herein correspond to the signals at terminal $IN_L$ and between a controller and level shifter when the upper drive DU is on in U.S. Pat. No. 5,373,435, respectively.

Supply Regulator

A supply regulator 592 includes a bandgap regulator 595 which generates an output voltage of about 5 volts. Regulator 595 is substantially independent over a wide range of temperatures and supply voltage (VDD). The output of a Schmitt trigger (i.e. comparator with hysteresis) 598, referred to as the LSOUT (low supply out) signal, identifies the condition of the supply voltage. When the input supply voltage at the VDD pin exceeds a turnon threshold (e.g. 12 volts), the LSOUT signal is at a low logic level. When the input supply voltage at the VDD pin falls below a turn-off threshold (e.g. 10 volts), the LSOUT signal is at a high logic level. During startup, the LSOUT signal is at a high logic level which sets the output of a latch 601, referred to as a STOPOSC signal, to high logic level. VCO 318 in response to the STOPOSC signal assuming a high logic level stops VCO 318 from oscillating and sets the CF pin equal to the output voltage of bandgap regulator 595.

When the supply voltage at the VDD pin exceeds the turnon threshold resulting in the LSOUT signal assuming a low logic level, the STOPOSC signal assumes a low logic level. VCO 318 in response to the STOPOSC signal being at a low logic level will drive inverter 60 so as to oscillate at a switching frequency as described herein with a substantially trapezoidal waveform being applied to the CF pin. Whenever the VDD pin voltage drops below the turnoff threshold and the gate drive at pin G2 assumes a high logic level, VCO 318 stops oscillating. Switches 100 and 112 will be maintained in their nonconductive and conductive states, respectively.

The output of latch 601 also assumes a high logic level resulting in VCO 318 stopping to oscillate and assuming a standby mode of operation whenever the output of a NOR gate 604 assumes a high logic level. The output of NOR gate 604, identified as a NOIGN signal, assumes a high logic level when after elapse of the ignition period either an overvoltage condition across lamp 85 or a capacitive mode of inverter operation is detected. Either of these conditions will occur when lamp 85 is removed from the circuit. The overvoltage condition will occur when lamp 85 fails to ignite.

Schmitt Trigger 598

Figure 5:
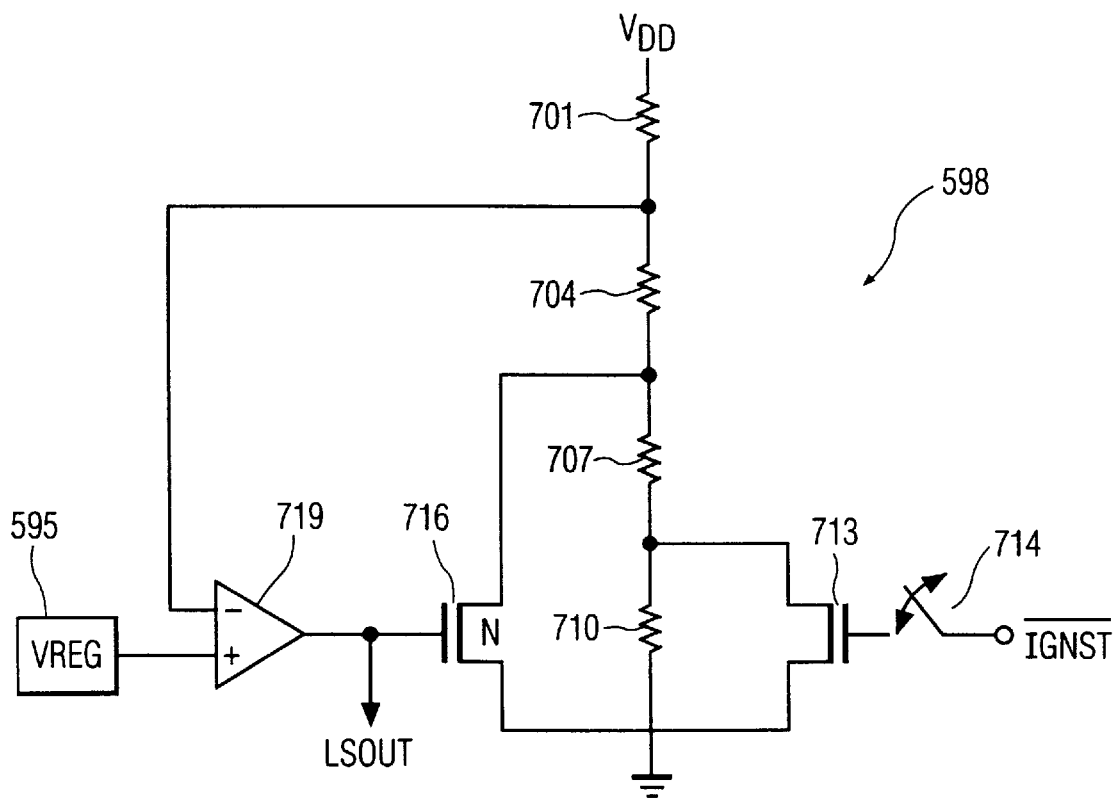
FIG. 5 is a schematic diagram of a Schmitt trigger shown in FIG. 3.

FIG. 5 illustrates Schmitt trigger 598. A pluarlity of resistors 701, 704, 707 and 710 are serially connected and form a voltage divider between pin VDD and a circuit ground. The conductive state of a transistor 713 in a first embodiment of the Schmitt trigger is controlled based on the logic level of a signal IGNST bar. This first embodiment of the Schmitt trigger is represented through closure of a switch 714. Closure of switch 714 in Schmitt trigger 598 is the same as and is preferably accomplished through elimination of switch 714 with signal IGNST bar being connected directly to the gate of transitor 713.

The voltage at an inverting input of a comparator 719 depends on the voltage divider which in turn depends on the voltage of pin VDD and the logic level of signal IGNST bar. Comparator 719 compares the voltage at the inverting input to the voltage at VREG 595. The hysteresis effect between the high and low logic levels of the ouput signal LSOUT is provided through a transistor 716.

The voltage at pin VDD varies during and after the preheat cycle. Signal IGNST bar asssumes a high logic level during the preheat cycle and a low logic level following the preheat cycle. The VDD pin voltage at which VCO 318 stops oscillating (hereinafter referred to as the under voltage lockout (UVLO) level) varies based on the logic level of signal IGNST bar. The UVLO level is at a higher threshold when the signal IGNST bar is at a high logic level (i.e. during preheat) as compared to when the signal IGNST bar is at a low logic level (i.e. after preheat).

In accordance with an alternative embodiment of the invention, Schmitt trigger 598 can be modified by no longer feeding the signal IGNST bar into the gate of transistor 713 (hereinafter referred to as the alternative Schmitt trigger embodiment). The UVLO level now will not vary. The alternative Schmitt trigger embodiment is represented by opening switch 714. Opening of switch 714, in the alternative Schmitt trigger embodiment, is the same as and is preferably accomplished through the elimination of transistor 713, switch 714 and connection to the signal IGNST bar.

The invention through use of Schmitt trigger 598 and/or the auxiliary power supply avoids flicker of lamp 85. Schmitt trigger 598 and/or the auxiliary power supply avoid IC 109 turning off momentarily due to the voltage level at pin VDD falling below a minimum threshold required to power IC 109. The voltage level at pin VDD can be maintained above the UVLO level as lamp 85 is turning on (i.e. after preheat) through the auxiliary power supply (i.e. secondary winding 78, resistor 162 and capacitor 163) supplementing the main power supply (established by zener diode 121 providing a pulsating voltage to capacitor 157) and/or by lowering the UVLO threshold. By varying the voltage applied to pin VDD and/or the UVLO level during preheat and then after preheat, the voltage level at pin VDD can be maintained above the UVLO level as lamp 85 is turning on.

Therefore, IC 109 through its VDD pin has at least one varying input signal for operating IC 109. When Schmitt trigger 598 rather than the alternative Schmitt trigger embodiment is used, the VDD pin voltage is characterized by different predetermined non-zero voltage ranges based on the mode of operation. During the preheat mode, the voltage at the VDD pin typically varies between an upper limit of about 12 volts and a lower limit of about 10 volts. After the preheat mode (i.e. during and after lamp turn on), the voltage at the VDD pin typically varies between an upper limit of about 12 volts and a lower limit of about 9 volts.

When the alternative Schmitt trigger embodiment rather than Schmitt trigger 598 is used, the VDD pin voltage is characterized by the same predetermined non-zero voltage range during both the preheat mode and after the preheat mode. The voltage at the VDD pin in the alternative Schnmitt trigger embodiment typically varies between an upper limit of about 12 volts and a lower limit of about 10 volts during both the preheat mode and after the preheat mode.

It is to be understood that the auxiliary power supply can be used with Schmitt trigger 598 or with the alternative Schmitt trigger embodiment. Similarly, Schmitt trigger 598 can be used without the auxiliary power supply (i.e. the auxiliary power supply is not required).

Multi-function Lamp Voltage Sensing Pin

The VL pin is used in regulating lamp power, protecting the lamp from overvoltage conditions and providing an output drive to differentiate between preheat and normal regulation. The input to the VL pin is a current proportional to a lamp voltage (e.g. peak or rectified average). The VL pin current is coupled to multiplier 306 which produces a signal representing the product of lamp current and lamp voltage and, as discussed above, is used for regulating lamp power. The VL pin current is also coupled to comparators 421, 424 and 427 for detecting overvoltage conditions. There is no need to regulate lamp power during the preheat cycle, however, since no full arc discharge yet exists within lamp 85. During the preheat cycle, inverter 60 operates at a much higher frequency than the resonant frequency of the unloaded LC tank circuit of winding 75 and capacitor 80. This much higher frequency during the preheat cycle results in a relatively low voltage across lamp 85 which will not damage the components within compact fluorescent lamp 10 or lamp 85.

During the preheat cycle, P-channel MOSFET 331 is turned on and N-channel MOSFET 332 is turned off so that the VL pin is at the same voltage potential as the VDD pin. The VL pin is therefore at a high logic level during the preheat cycle and at a low logic level otherwise (e.g. during ignition and steady state conditions). These two different logic levels at the VL pin identify whether inverter 60 is operating in a preheat or non-preheat mode of operation.

Capacitive Mode Protection

Inverter 60 is in a capacitive mode of operation when the current flowing through winding 75 leads in phase the voltage across switch 112. In the near capacitive mode, current flowing through winding 75 lags slightly behind but is within a predetermined interval of time (e.g. typically about 1 micro second) of the voltage across switch 112. In other words, the current flowing through winding 75 lags within a predetermined phase difference behind the voltage across switch 112.

To move the switching frequency of inverter 60 away from entering into and if already within then as quickly as possible away from the capacitive mode of operation, lamp current is compared to a different one of two gate voltages every ½ cycle of one inverter switching period in determining the phase difference. In contrast thereto, conventional capacitive mode protection schemes do not distinguish between capacitive and near capacitive modes of operation and therefore either over compensate or under compensate when such modes are detected.

Capacitive mode conditions can be entered into very quickly when, for example, lamp 85 is removed from load 70. Damage to the switching transistors (e.g. switches 100 and 112) can occur rapidly once in the capacitive mode and often can not be avoided through the conventional protection scheme.

In accordance with the invention, the near capacitive mode condition is determined by monitoring the sign of the voltage waveform at the RIND pin during the leading edge of each gate pulse drive produced at pins G1 and G2. Once both the near capacitive mode of operation and the over-voltage maximum threshold are detected, CCO 318 increases immediately (e.g. within 10 microseconds) to its maximum value.

The capacitive mode condition is determined by monitoring the sign of the voltage waveform at the RIND pin during the trailing edge of each gate pulse drive produced at pins G1 and G2, respectively. Once the capacitive mode of operation is detected, CCO 318 increases immediately (e.g. within 10 microseconds) to its maximum value so as to ensure that inverter 60 is operating within an inductive mode, that is, with the voltage developed across switch 112 during its nonconductive state leading in phase over the current flowing through winding 75. The maximum oscillating (switching) frequency should be well above the unloaded resonant frequency. Typically, the maximum frequency of CCO 318 (i.e. minimum time interval of the switching period) is set equal to the initial operating frequency of inverter 60 (e.g. 100 kHz).

As can now be readily appreciated, the invention provides a compact fluorescent lamp which prevents excessive lamp current from flowing when regulating lamp power. The compact fluorescent lamp ballast particularly limits the maximum level of lamp current at low lamp voltages.

It will thus be seen that the objects set forth above and those made apparent from the preceding description are efficiently attained and, since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

I claim:

1. A ballast for powering a load having a lamp, comprising:
    switching means responsive to driving signals for switching into conductive and nonconductive states whereby power is delivered to the load such that a voltage is applied to and current flows through the lamp;
    control circuitry for producing the driving signals based on a lamp power signal and including a multiplier for generating the lamp power signal which is proportional to the product of lamp current and a signal representing lamp voltage whereby the power delivered to the load is regulated, said control circuitry including a first input for receiving the signal representing lamp voltage; and
    protection means for establishing a prefixed minimum level for the signal representing lamp voltage thereby setting a prefixed maximum level for lamp current.

2. The ballast of claim 1, wherein the protection means includes a voltage clamp connected to the first input.

3. The ballast of claim 2, wherein the control circuitry includes a second input at a supply voltage, the voltage clamp applying a voltage to the first input substantially equal to the supply voltage at the second input.

4. The ballast of claim 3, further including a voltage source connected to the second input for powering the control circuitry.

5. The ballast of claim 4, wherein the voltage clamp includes a diode connected between the second input and the first input.

6. The ballast of claim 2, wherein the control circuitry includes a second input at a supply voltage and the voltage clamp includes a diode connected between the first input and the second input.

7. A compact fluorescent lamp, comprising:
    switching means responsive to driving signals for switching into conductive and nonconductive states whereby power is delivered to the lamp such that a voltage is applied to and current flows through the lamp;
    control circuitry for producing the driving signals based on a lamp power signal and including a multiplier for generating the lamp power signal which is proportional to the product of lamp current and a signal representing lamp voltage whereby the power delivered to the lamp is regulated, said control circuitry including a first input for receiving the signal representing lamp voltage; and
    protection means for establishing a prefixed minimum level for the signal representing lamp voltage thereby setting a prefixed maximum level for lamp current.

8. The compact fluorescent lamp of claim 7, wherein the control circuitry includes a second input at a supply voltage and a diode connected between the first input and the second input.

9. A method for controlling the power delivered by a ballast to a lamp, comprising:
    supplying a signal representing lamp voltage to a first input of a control circuit;
    establishing a prefixed minimum level for the signal;
    generating driving signals from the control circuit based on a lamp power signal produced by a multiplier, the lamp power signal being proportional to the product of lamp current and the signal representing lamp voltage; and
    switching a pair of transistors configured in a totem pole arrangement into conductive and nonconductive states in response to the driving signals whereby power delivered to the lamp is regulated and whereby a prefixed maximum level for lamp current is set based on the prefixed minimum level of the signal representing lamp voltage.

10. The method of claim 9, further including applying a supply voltage to a second input of the control circuit to power the control circuit, and wherein establishment of the prefixed minimum level for the signal representing lamp voltage includes applying a voltage to the first input which is substantially the same as the supply voltage.

11. A power supply for a compact discharge lamp whose lamp voltage varies inversely with lamp temperature, comprising:
    switching means coupled to the discharge lamp for controlling the power supplied to the discharge lamp,
    means for deriving a lamp power signal determined by a first signal representing lamp voltage and a second signal representing lamp current,
    control circuit means for regulating lamp power via control of said switching means as a function of said lamp power signal,
    means coupled to said control circuit means for adjusting the level of lamp power and thereby the level of illumination produced by the discharge lamp, and
    protection means for establishing a prefixed minimum level for the first signal thereby setting a prefixed maximum level for lamp current.

12. The power supply as claimed in claim 11 further comprising an auxiliary power supply which supplies an auxiliary DC supply voltage to the control circuit means in a manner so as to reduce any tendency for lamp flicker during lamp ignition.

13. The power supply as claimed in claim 11 wherein said lamp power adjusting means comprises a triac dimmer circuit coupled between input terminals for a low frequency source of supply voltage and a dim control input of the control circuit means.

14. The power supply as claimed in claim 13 wherein the triac dimmer circuit comprises a triac and means for adjusting the firing angle of the triac so as to set a desired illumination level of the discharge lamp.

15. The power supply as claimed in claim 11 wherein the control circuit means comprises a first input for receiving said first signal and a second input which receives a supply voltage for the control circuit means, and
    said protection means comprises a voltage clamp including a diode coupled between said first and second inputs of the control circuit means.

16. The power supply as claimed in claim 11 wherein the switching means comprises first and second transistors connected as a half-bridge inverter.

* * * * *